United States Patent [19]

Kozak, III

[11] Patent Number: 5,304,303

[45] Date of Patent: Apr. 19, 1994

[54] APPARATUS AND METHOD FOR SEPARATION OF IMMISCIBLE FLUIDS

[76] Inventor: Andrew F. Kozak, III, 900 N. Jackson St., Media, Pa. 19063

[21] Appl. No.: 975,613

[22] Filed: Nov. 12, 1992

Related U.S. Application Data

[63] Continuation-in-part of Ser. No. 816,126, Dec. 31, 1991, abandoned.

[51] Int. Cl.$^5$ .............................................. C02F 1/40
[52] U.S. Cl. .............................. 210/242.3; 210/257.1; 210/521; 210/540; 210/923
[58] Field of Search .................. 210/242.3, 253, 257.1, 210/258, 259, 262, 512.1, 513, 519, 521, 532.1, 538, 540, 923

[56] References Cited

U.S. PATENT DOCUMENTS

| | | | |
|---|---|---|---|
| 156,751 | 11/1874 | Bates | 210/540 |
| 1,958,054 | 5/1934 | Linnminn Jr. | 210/572.1 |
| 2,180,811 | 11/1939 | King | 210/512.1 |
| 3,532,219 | 10/1970 | Valdespino | 210/242.3 |
| 3,618,768 | 11/1971 | Brown | 210/923 |
| 3,762,548 | 10/1973 | McCabe | 210/540 |
| 4,108,773 | 8/1978 | Macaluso | 210/242.3 |
| 4,111,809 | 9/1978 | Pichon | 210/923 |
| 4,151,081 | 4/1979 | Bolli et al. | 210/923 |
| 4,198,300 | 4/1980 | Williams | 210/170 |
| 4,252,649 | 2/1981 | Favret, Jr. | 210/538 |
| 4,720,341 | 1/1988 | Arnold | 210/540 |
| 4,795,567 | 1/1989 | Simpson et al. | 210/540 |
| 4,804,471 | 2/1989 | Velisavljevic | 210/540 |
| 4,816,146 | 3/1989 | Schertler | 210/522 |
| 4,938,878 | 7/1990 | Hall | 210/540 |
| 5,030,342 | 7/1991 | Ortega | 210/242.3 |
| 5,076,915 | 12/1991 | Rose | 210/540 |

FOREIGN PATENT DOCUMENTS

1385323  2/1975  United Kingdom.

*Primary Examiner*—Christopher Upton
*Attorney, Agent, or Firm*—Lipton, Robert S.

[57] ABSTRACT

This invention relates to an apparatus and method for separating immiscible liquids having different specific gravities. Although the disclosure illustrates the invention by showing its application to the separation of oil and water, the invention may be used to separate many other immiscible liquids having different specific gravities. A column of a liquid is supported by vacuum in a vertical column partially submerged in a reservoir containing a first liquid. A mixture of first and second liquids is continuously injected into a separation vessel disposed within the column. Due to their difference in specific gravities, the lighter second fluid will ascend to occupy the upper region of the column while the heavier first fluid will occupy the lower region until equilibrium is achieved. As the mixture continues to enter the system, equilibrium is maintained; the liquids of the upper and lower phases are displaced by equal volumes of incoming liquids. An evacuation tube with a valve disposed therein is connected at the top of the vertical column for the removal of the lighter liquid at reduced pressure by means of a cell-siphon. The heavier liquid is displaced and discharged through the submerged end of the vertical column. Other features are disclosed which increase the rate and efficiency of the separation.

8 Claims, 6 Drawing Sheets

APPARATUS AND METHOD FOR SEPARATION OF IMMISCIBLE FLUIDS

It is a continuation-in-part of U.S. patent application Ser. No. 07/816,126 filed Dec. 31, 1991, now abandoned.

BACKGROUND OF THE INVENTION

It is generally recognized that there is a need to separate immiscible liquids. This need is particularly acute with respect to various environmental accidents. Hazardous liquids frequently become mixed with water normally found in the environment. Oil spills are, unfortunately, an increasingly common occurrence which require the separation of the oil so that it may be eliminated as a hazard to the environment.

A wide variety of methods and apparatus have heretofore been proposed to provide an efficient means for removing oil or other liquid contaminants from water, but have been met with little success. Recent methods of dealing with the problem of oil pollution include chemical dispersant, as well as various other methods for separating the oil from the water. For instance, U.S. Pat. No. 4,108,773 of Macaluso issued Aug. 22, 1978, teaches an oil salvaging apparatus comprising a chamber into the base of which contaminated seawater is charged for separation of the liquids of differing densities. The Macaluso reference like many others, however, suffers from significant shortcomings inherently associated with its design, namely, it cannot guarantee the purity of both fluids to be separated because of its inability to regulate injection and evacuation rates.

In Macaluso, water is evacuated from the chamber by means of a pump. The escape velocity of water, therefore, will exceed the buoyancy force of the oil in mixture with the water, preventing the oil's assent to the top of the chamber and instead, being discharged along with the water. Similarly, because the Macaluso reference provides no means for effectively regulating the contaminated water's injection rate, and because the chamber will only support a predetermined weight of water under vacuum, excessive injection rates will result in the discharge of unseparated oil and water either through the chamber's top oil evacuation conduit or out of its lower submerged end.

In general, the prior art methods of separating immiscible liquids fail to take advantage of related fundamental fluid dynamics and separation principles and, therefore, are unable to achieve superior separation rates which are both measurable and predictable. Furthermore, and as exemplified above, prior art methods of separation are often incapable of assuring qualitatively acceptable end-products.

Other methods involve the use of skimmers, surface guides and the like to channel the surface oil to a location where it can be removed by pumps. However, such water is usually removed with the oil.

In many cases, the oil layer is very thin, making it particularly difficult to remove without also removing water. In order to remove small amounts of oil, large amounts of water must also be removed.

The subject invention completely obviates all of the shortcomings associated with the prior art by providing an apparatus and method for continuously separating oil from water at superior rates and purities.

SUMMARY OF THE INVENTION

The present invention includes a vertical tube or column the lower terminal end of which is positioned in a reservoir containing a first liquid. A vacuum system is employed to support a column of the first liquid within the vertical column. Upon introduction of a mixture of the first liquid and a second liquid into the column, however, much of the first liquid will be displaced by the mixture and upon separation thereof an equilibrium will be achieved; the less dense second liquid occupying the upper portion of the column, the heavier first liquid occupying the lower portion. The two immiscible liquids will converge at a predictable situs forming a visible meniscus. The vacuum will now support a volume of the first liquid as defined by that meniscus which will not change under controlled conditions.

The two immiscible liquids to be separated are injected into a separation vessel disposed within the vertical column's middle region at a continuous and controlled rate. An evacuation tube with a valve disposed therein is connected at the top of the vertical column for the removal of the lighter liquid while the heavier liquid is displaced by new volumes of the heavier liquid, the former being discharged through the submerged end of the vertical column. Assuming that both valves remain open, the meniscus level will remain constant regardless of the quantity of either liquid introduced.

A superior separation rate is accomplished by maximizing the terminal velocity of the lighter liquid up the column. This is accomplished by several means including, for example, controlling the horizontal injection rate of the liquids as they enter the separation vessel and by adjusting the diameter of the vertical column at strategic locations. The former act will prevent the buoyancy force of the lighter liquid from being overcome by the downward force associated with the escape velocity of the heavier liquid. Narrowing of the vertical column above and below the separation vessel causes smaller droplets of the lighter liquid to merge or coalesce, thereby increasing their overall volume and, consequently, increasing their upward velocity.

Purity of the separated liquids is accomplished through the strategic location of the separation vessel and associated injection conduits in close proximity to the above described meniscus and further by placement of liquid outlet means at optimal distances from the separation site. In addition, a trap is provided in upper evacuation tube to catch any traces of the heavier liquid which may be present. Also, the lower terminal end of the vertical column can be connected to additional tubing to form a double "U" shaped device. This permits the length of the tube to be increased, thereby providing a greater region within the vertical column in which separation may occur.

In order to remove the upper phase, a negative pressure slightly greater than that produced by the vacuum pump must be applied. This negative pressure is obtained through the use of a siphon.

Partial preseparation may be accomplished, for some applications, through the use of an auger. The vertical column may also be modified to contain additional concentrically-oriented tubes which can be used to separate multiple liquids.

It is, therefore, a principle object of the present invention to provide an apparatus and method for continuously separating immiscible liquids at a superior rate.

It is another principle object of the present invention to provide an apparatus and method for continuous separation of immiscible liquids whereby pure end-products are achieved.

Another object of the present invention is to provide a separation apparatus and method capable of exploiting fundamentals of fluid dynamics and separation principles such that efficient separation is achieved.

Yet another object of the present invention is to provide a method and apparatus for separating immiscible liquids at predictable and easily measurable rates.

Other objects and advantages will be recognized upon review of the accompanying description in conjunction with the drawings that follow.

DESCRIPTION OF THE PREFERRED EMBODIMENT

Before the design of the method and apparatus for separating immiscible liquids can be fully appreciated, it is first necessary to be familiar with fundamental fluid dynamics as they relate to separation. For illustrative purposes, water and oil will serve as the liquids to be separated although their use is not intended to be limiting.

When an oil droplet rises through the water, its motion is impeded by the force of water resistance. The force is dependent on the shape of the rising droplet and its vertical velocity. The viscous drag acts on all falling bodies and rising bodies, but the exact details of the motion can be examined for a small spherical object rising through a viscous medium.

Figures 1, 4:
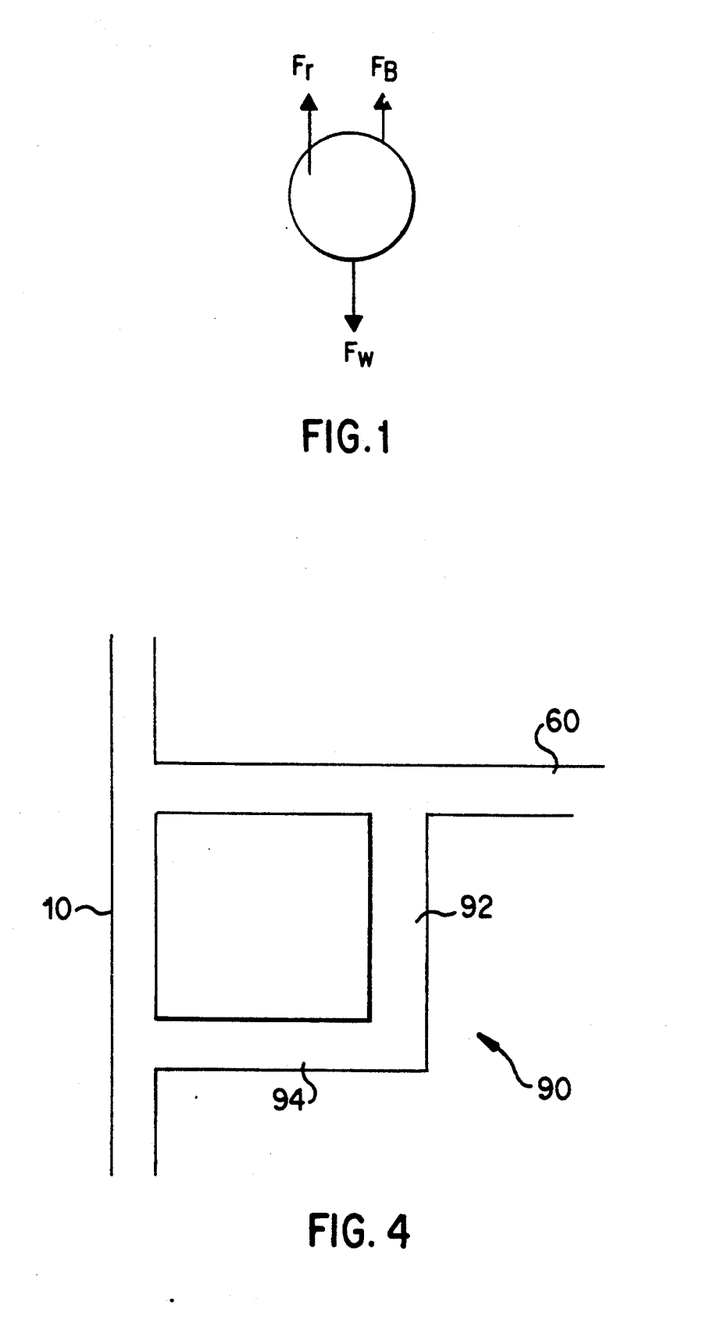
FIG. 1 is a diagrammatic illustration of the forces acting upon a sphere of liquid.
FIG. 4 is a drawing of the trap which may be used with the present invention.

The three forces acting on an oil droplet of spherical shape rising through a viscous medium is shown in FIG. 1, namely, $F_W$—the weight of oil sphere; $F_B$—the buoyant force of the fluid and $F_p$—the force due to frictional resistance.

The weight of the oil particle can be expressed by the following equation:

$$F_W = \rho g V$$

$\rho_o$ = the density of the sphere
V = the volume of the sphere (which is equal to $4/3 \pi r^3$)

Therefore the equation develops into an expression in terms of radius of the droplet and the density of the oil droplets as follows:

$$F_W \rho_o g 4/3 \pi r^3 = 4/3 \pi g \pi r^3$$

The buoyant force $F_B$ equal to the weight of the fluid displaced by the sphere:

$$F_B = \rho_W g V = 4/3 \rho_W g \pi r^3$$

The frictional resistance force ($F_p$) is calculated by Stokes' Law as follows:

$$F_r = 6 \pi \mu r v$$

where:
$\mu$ = viscosity of the fluid
v = velocity of the oil droplet
r = oil droplet radius At the instant before the oil sphere begins to rise, the frictional resistance force is zero since the velocity of the sphere is also zero. As the sphere accelerates in the upward direction, the velocity increases and the frictional resistance force increases. Therefore, when the net upward force balances the downward weight, the summation of forces equals zero and the oil droplet sphere reaches its terminal velocity. This condition can be shown by the following equation:

$$F_r + F_B = F_W$$

$$6 \pi \mu r v_T + 4/3 \rho_W g \pi r^3 = 4/3 \rho_o g \pi r^3$$

$$6 \pi \mu r v_T + 4/3 \rho_o g \pi r^3 = 4/3 \rho_W g \pi r^3$$

the equation will reduce to:

$$v_T = \frac{2}{9} \frac{D^2}{\mu} g(\rho_W - \rho_o) V v_T = \frac{D^2}{18} \frac{g}{\mu} (\rho_W - \rho_o)$$

where:
$V_T$ = Vertical velocity of oil droplets in sec.
g = Acceleration due to gravity
$\mu$ = Absolute viscosity
$\rho_W$ = Density of water
$\rho_o$ = Density of oil
D = Diameter of oil droplet The equation states that the vertical velocity (VT) of an oil droplet in water depends directly on the densities of the liquids and the square of the diameter and indirectly on the viscosity of the liquid through which it travels.

Thus it can be appreciated that the rate of separation is greatly increased by the generation of large oil droplet sizes to obtain maximum terminal velocity. As will be discussed in more detail below, the design of the subject invention provides several means for increasing oil droplet size. Also, since the oil droplets frequently contain amounts of dissolved air, the vertical velocity will be enhanced in a reduced pressure environment where expansion is favored.

In addition to the fundamentals of fluid dynamics recited above, it is critical to a full appreciation of the present invention to understand the behavior of liquids having different specific gravities in a vertical column. The behavior of oil and water alone, and in mixture, in a vertical column is shown graphically in FIGS. 2A and 2B. These Figures depict the maximum height achieved by each liquid in a vertical column in a perfect vacuum condition.

Figure 2A:
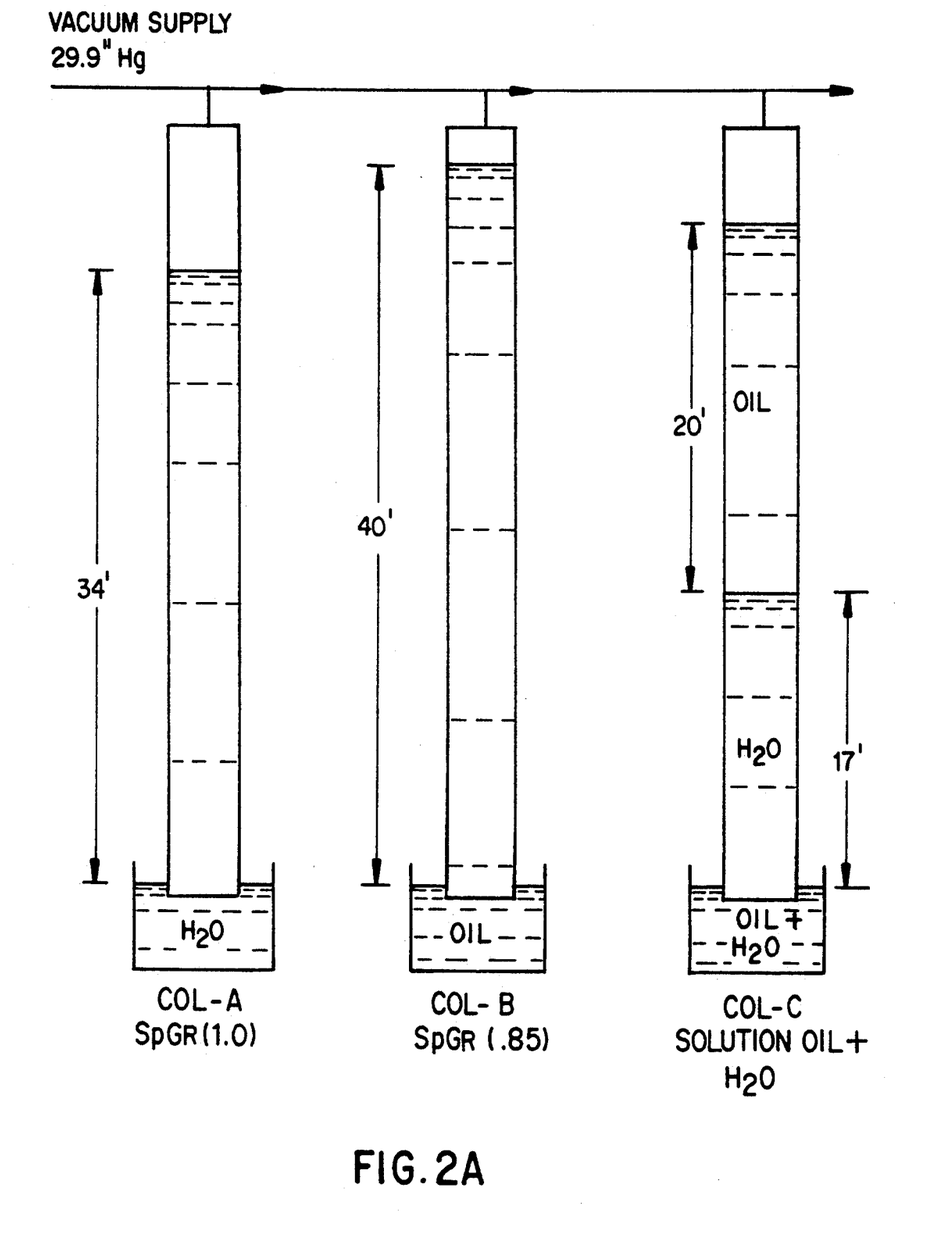
FIG. 2A is a diagrammatic illustration of the maximum column height each liquid will achieve under a perfect vacuum.

Referring now to FIG. 2A, Column A, when said column is subjected to a maximum vacuum of 29.9" Hg (hereafter referred as "maximum vacuum") the column of water will rise to a height of 34' at sea level, regardless of the column's diameter. If a perfect vacuum could be achieved, water would rise to this height above the liquid contained in the reservoir and remain there. As a practical matter, however, the height of the water column will be somewhat lower because a perfect vacuum cannot be efficiently obtained.

In Column B at maximum vacuum, oil will attain a maximum height of 40'. The reason for the difference in heights under the same condition is due to their differing densities; water having a specific gravity 1.0 which is greater than that of oil which is 0.85.

Referring now to Column C, wherein a mixture of water and oil occupy the reservoir, we find that at maximum vacuum the water will reach a maximum of 17' above the mixture while oil, having a lower specific gravity, attains a height of 20' on top of the 17' column of water. The overall height of the liquid column is $17' + 20' = 37'$, a height greater than the maximum height of and less than the maximum height of oil.

The maximum volume of each component of the mixture occupying the column can be calculated as follows assuming a 6" diameter of the column:

$$V_w = \frac{(3.14)(6^2)(204")}{1728 \text{ in.}^3} = 13.35 \text{ ft.}^3 (7.481 \text{ gal.}/\text{ft.}3) = 99.88 \text{ gal.}$$

$$V_o = \frac{(3.14)(6^2)(240")}{1728 \text{ in.}^3} = 15.7 \text{ ft.}^3 (7.481 \text{ gal.}/\text{ft.}3) = 117.45 \text{ gal.}$$

Note that, although different volumes of water and oil occupy the column, the vacuum will support a nearly equal weight of each. Multiplying the volume of water and oil by their respective specific gravities proves this fact as follows:

$$M_W = 99.88 \text{ gal. } (8.33 \text{ lbs./gal.}) = 832.00 \text{ lbs.}$$

$$M_o = 117.45 \text{ gal. } (0.85)(8.33 \text{ lbs./gal}) = 831.60 \text{ lbs.}$$

Because the bottom of all columns are open and because the vacuum at 30" Hg will only support 832 lbs. of water, it becomes apparent that any additional water introduced into Column C will be discharged out the bottom of the Column until the system is restored to equilibrium.

It now becomes obvious that if we inject oil into the same Column C, the additional oil will float to the top of the water Column, increasing the overall weight of oil while a proportional weight of water is simultaneously discharged. Thus, if no means of escape is provided for the upper phase, the lower phase will decrease in volume as the upper phase increases.

Finally, introduction of a water and oil mixture into Column C will result in displacement of proportional volumes of each respective liquid assuming there is provided an evacuation means for the upper phase.

Figure 2B:
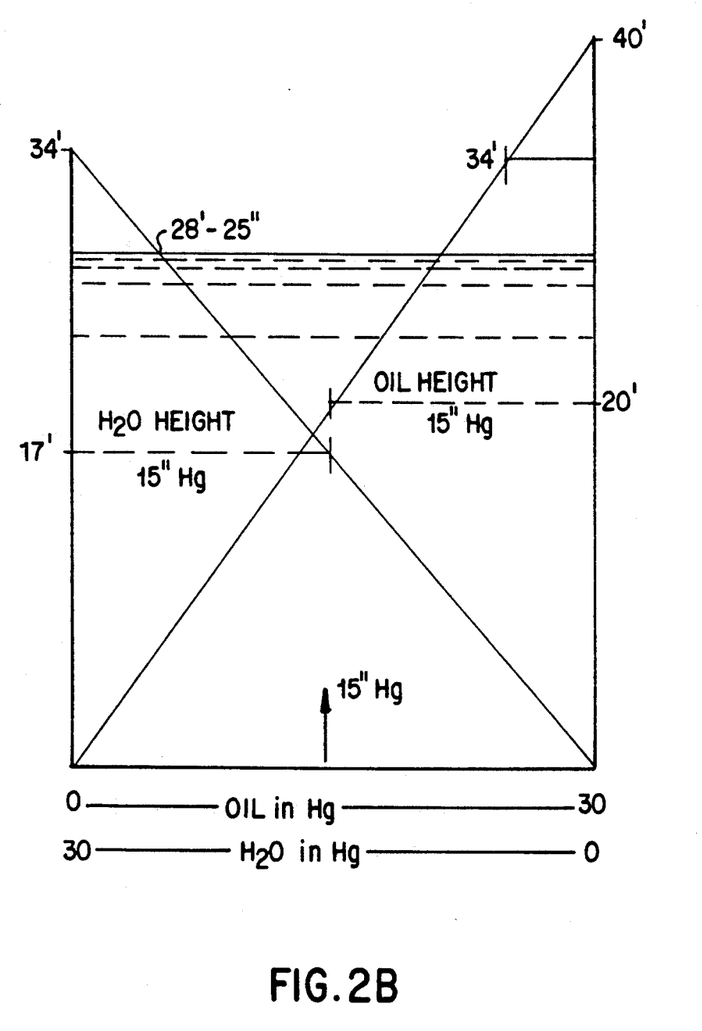
FIG. 2B is a graphical illustration of the results associated with FIG. 2A.

FIG. 2B is a graphical illustration of the results associated with FIG. 2A. It should be appreciated that this graph can be used as a standard to predict the point of interface of any pair of imiscible liquids at any reduced pressure. This is accomplished by dividing the maximum height of water (34') by the specific gravity of the heavier of the two liquids to be separated which equals the maximum height that the lower phase will achieve. For example, if water was to be separated from a liquid having a higher specific gravity, say 1.2 for instance, the interface of that liquid with water would be $34'/1.2 = 28.3'$ above the surface of that liquid. As will be discussed in greater detail below, this value is critical for the proper location of the separation vessel which, in turn, provides superior separation rates and pure yields. In general, the point of injection should always be $2' - 3'$ below the interface of the two liquids.

Figure 3:
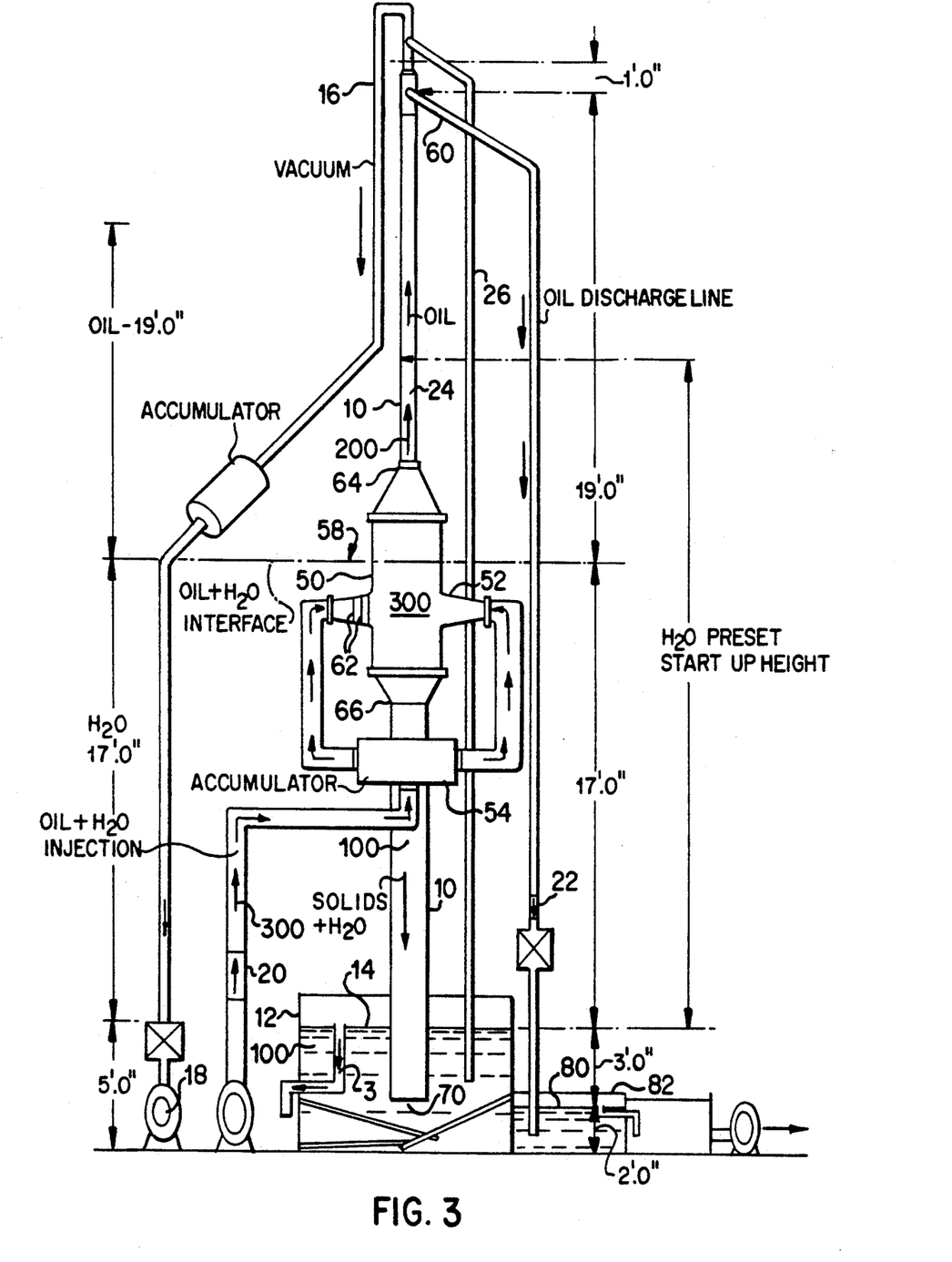
FIG. 3 is a schematic representation of the present invention.

Having revealed the fundamental fluid dynamics and separation principles associated with the instant invention, reference is now made to FIG. 3 wherein the preferred embodiment is illustrated in diagrammatic form. The present invention includes a vertical tube or column 10 the lower terminal end of which is positioned in a reservoir 1 2 containing, in this example, water 100 filled to level 14. Reservoir 12 maintains a constant water level by a drain line 8 thereby maintaining vacumm. The drain water tank at the open end of the water column has a conical base to trap the solids which are drained automatically. A Sluice Gate 102 when closed allows drainage without affecting the water level of the resevoir 1 2.

A separation vessel 50 is disposed within the midregion of vertical column 10. As mentioned above, the placement of separation vessel 50 is depends upon the calculated interface level of the two liquids; vessel 50 being situated so as to enclose said point of equilibrium.

A vacuum system is adapted to the top of vertical column 10 and comprises a vacuum line 16 which is in turn connected to a vacuum source 18. The vacuum source 18 may be either a vacuum pump or, under appropriate circumstances, a siphon. It should be recognized that the vacuum system can be adapted to read exhaust vapors drawn therein for the detection of contaminents. A condenser may be added (not shown) to collect the contaminants in the form of liquid for subsequent treatment in accordance with environmental specifications and regulations.

Check valves 20 and 22 are used when starting the device. As a partial vacuum is drawn on vertical tube 12, both check valves 20 and 22 remain closed. After the water has been drawn to start-up level 24 in vertical column 10, as viewed through site gauge 26, the system is ready for introduction of the immiscible water and oil mixture 300.

The oil and water mixture 300 is charged to the separation vessel 50 through a plurality of injection conduits 52 in a horizontal plane. The location of injection conduits 52 is a critical factor in achieving superior separation rates and purity. Mixture 300 should always be injected into separation vessel 50 at a location just below the liquid interface level. Recall that when water is added to oil, the water will tend to descend slowly through the oil. BV contrast, however, when oil is added to a body of water, the oil will rise more quickly through the water. This phenomena is a function of the differing viscosity of the respective liquids, oil moving more quickly through the less viscous water. From the discussion above, recall that an oil droplet's velocity is inversely proportional to the viscosity of the liquid through which it travels. Thus, it can be appreciated that if mixture 300 was instead injected at a location above the interface of the two liquids, the rate of separation would necessarily be reduced.

Check valve 20 is opened and the mixture is Pumped by diaphragm pump 56 to accumulator 54 in series to reduce flow variations. Upon injection of mixture 300 into separation vessel 50, much of the water 100 will be displaced by the mixture 300 and upon separation thereof, an equilibrium will be achieved; the less dense oil 200 occupying the upper portion of column 10, the heavier water 100 occupying the lower portion. The two immiscible liquids will interface at the situs predicted by FIG. 2B at 17' above water line 14 and forming a positive meniscus 58. The vacuum will now support a 99.88 gallon volume of water assuming a perfect vacuum exists. Meniscus 58 will not change under controlled conditions as described below.

As injection of mixture 300 continues, oil is removed through evacuation conduit 60 connected at the top of vertical column 10 while displaced water is discharged through the submerged end of vertical column 10 into resevoir 12. With both valves 20 and 22 in the open position, the interface level will remain relatively constant regardless of the quantity of either liquid introduced. However, the injection rate must be controlled so that its horizontal force is not translated into vertical force inside separation vessel 50, an occurance which adversely affects the velocity of oil 200 up column 10 by inhibiting its buoyancy force.

Controlling the horizontal injection rate of mixture 300 is accomplished in several ways. First, separation vessel 50 provides an enlarged region for permitting separation of the oil and water. It provides space for permitting dissipation of the kinetic energy generated by mixture 300 as it enters through injection conduits 52. Secondly, injection conduits 52 broaden in diameter as they approach separation vessel 50 thereby reducing the pressure of its contents. Thirdly, the injection conduits 52 may be adapted with one or more screens 62 through which mixture 300 must pass thereby affectively reducing horizontal velocity. Oil 200 in mixture 300 has an affinity for the screen 62 and will tend to cling thereto forming longer strands of oil which eventually break free. Recall that an increase in the diameter of the oil sphere will cause it to accelarate more quickly to its terminal velocity thus increasing the separation rate.

The diameter of oil spheres is also increased by adjusting the diameter of the vertical column 10 at strategic locations. Narrowing of the vertical column 10 above and below the separation vessel 50 at points 64 and 66, respectively, causes smaller droplets of oil 200 to merge or coalesce, thereby increasing their overall volume and, consequently, increasing their upward velocity. The object is to slow the velocity of incoming oil and water so that separation may more effectively be accomplished and then, as oil droplets overcome the water's escape velocity and the forces associated with the droplet's mass and friction, the oil will rise and coalesce in the restricted diameter 64 of column 10. Similarly, any oil initially forced below separation vessel 50 will tend to coalesce in the restricted diameter 66.

Flow rates of the vacuum system, of water 100, oil 200 and mixture 300 throughout the system are constantly monitored with sensors and regulated with modulators.

Figures 5, 6:
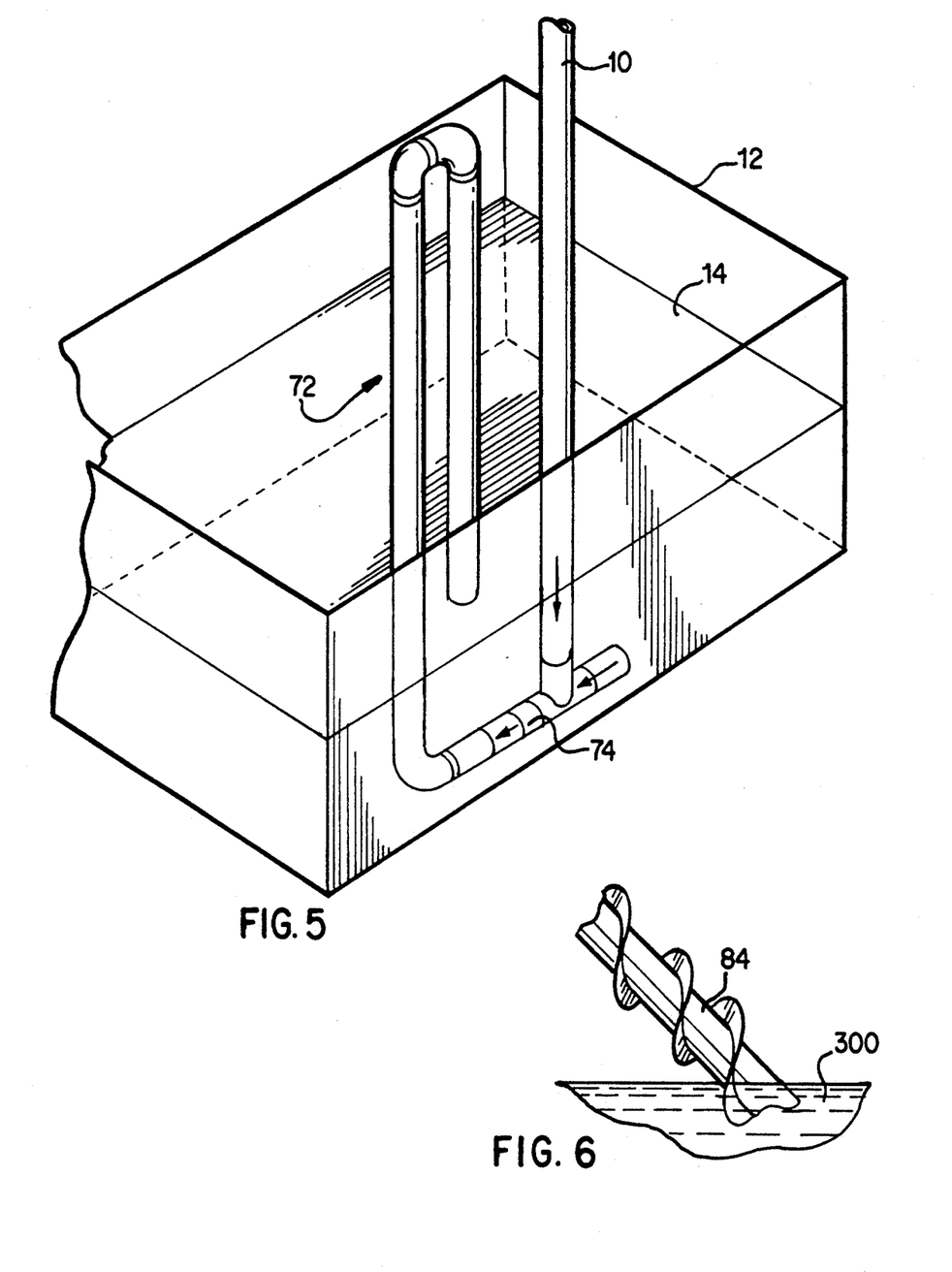
FIG. 5 is a schematic representation of another embodiment of the vertical column of the present invention.
FIG. 6 is a schematic representation of an auger used with the present invention.

Purity of the separated liquids is accomplished through the strategic location of the separation vessel 50 and, more specifically, the associated injection conduits 52 in close proximity to the above described interface level 58. Purity is further accomplished by placement of oil evacuation tube 60 and water discharge location 70, at optimal distances from the separation site. Maximizing the distance between the separation vessel 50 and these two locations reduces the chances of oil reaching resevoir 1 2 and water reaching evacuation tube 60. In addition, a trap 90 (FIG. 4) may be provided in upper evacuation tube 60 to catch any traces of water which may be present. The use of this device will be described in more detail below. Also, the lower terminal end of vertical column 10 can be connected to additional tubing to form a double "U" shaped tube (FIG. 5).

U-tube 72 affectively increases the length of column 10 thereby providing a greater region within the vertical column in which separation may occur. As may be apparent upon a review of FIG. 5, for purposes of calculating pressures and the height of water 100 which can be supported by a given partial vacuum, the reference point is not the surface 14 of the water in reservoir 12, but rather the lowest point 74 in U-tube 72. Thus, the effective height of the apparatus is increased by the distance from the bottom of the tube 72 to the upper surface 14 of the water in reservoir 12.

Referring once again to FIG. 3, in order to further facilitate the removal of oil 200, a negative pressure slightly greater than that produced by the vacuum pump may be applied. This negative pressure is obtained through the use of a siphon. The opposite end of evacuation tube 60 is shown immersed in oil having a level 80 in a reservoir 82. BV positioning the level 80 of the oil 200 below the level 14 of water 100 a siphon effect may be created so that oil may be continuously drawn from vertical column 10.

The syphon for the liquid separator must meet three conditions: 1) the fluid connections must never be broken $\Delta P > p$, h; 2) for net flow, driven by the syphon effect, it is necessary that the gravitational force be positive even though there is a difference in the fluid densities of the legs, and 3) nowhere in a syphon effect should the height exceed H*—defined as the height of pressure Pa which can support the fluid under a vacuum. To reach or exceed this height leads to cavitation and syphon effect is broken. It should be further noted that the actual atmospheric pressure (Pa) may vary by several inches of mercury which corresponds to several feet of water and therefore, these variations must be allowed for in the practical design or made part of the overall control.

Referring once again to FIG. 4, a trap 90, which may be used with the present invention is inserted between the upper end of column 10 and evacuation tube 60. The trap 90 consists of tubes or pipes 92 and 94 which connect as shown to column 10 and evacuation tube 60. Any water 100 remaining in the oil may be caught after it flows into exit tube 60 by falling into tube 92. Any water which is in the oil which may be drawn into tube 94 has an opportunity to separate out and flow back into column 10. By extending tube 94 and adding additional tubes 92, additional traps may be formed. Thus, an additional means is provided for capturing any remaining water. The trap 90 will be particularly useful when fluids having specific gravities which are relatively close to one another, as well as in situations where the apparatus is run at high speed offering less of an opportunity for separation to occur in column 10.

Referring now to FIG. 6, partial preseparation of mixture 300 may be accomplished, for some applications, through the use of an auger 84. The auger 84 is immersed in mixture 300, or other immiscible fluids. As it is rotated, the heaver water 100 falls downward while the lighter oil 200 is carried upward where it is passed by means not shown to injection conduits 52. Use of an auger is particularly useful in environmental spills involving oil and the like. A number of augers may be used to achieve increased efficiency.

Figure 7:
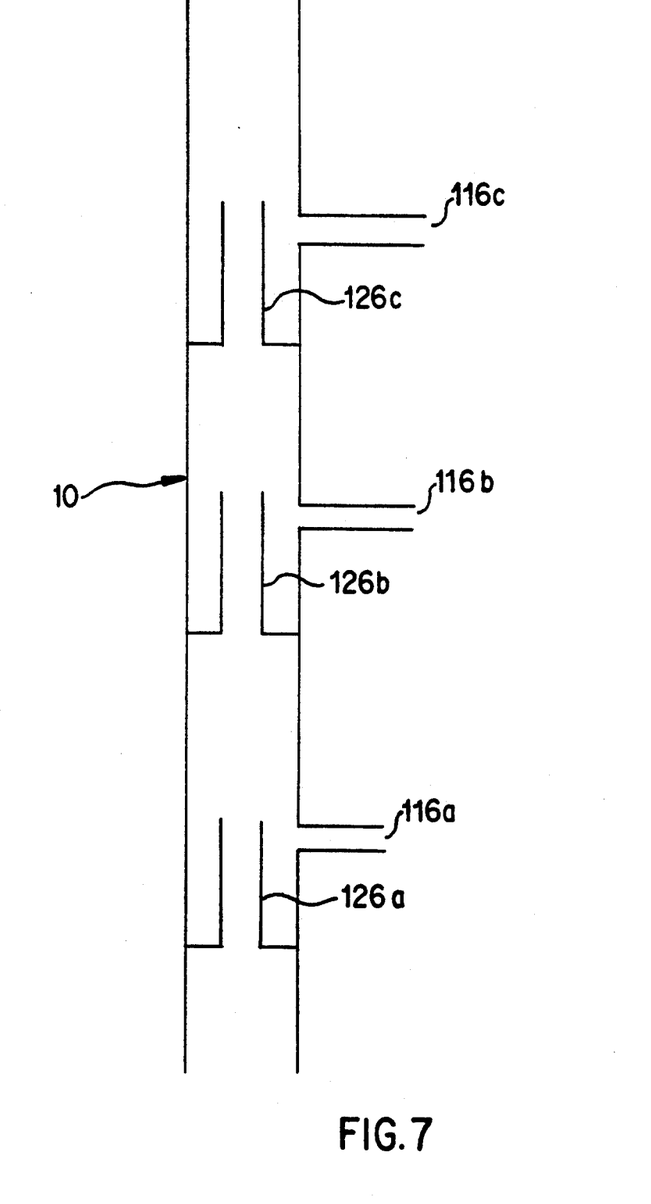
FIG. 7 is yet another embodiment of the vertical column of the present invention.

Finally, it should be recognized that vertical column 10 of the present invention may be adapted to separate more than four liquids from one another. Using the principles taught herein, theoretically any number of immiscible liquids could be separated from one another provided that the difference between their specific gravities are adequate to ensure separation in the space available. Referring to FIG. 7, the upper portion of vertical column 10 is shown having exit tubes 116a, 116b, and 116c. As in the prior embodiment, four fluids are injected into the device through injection conduits 52. The heaviest liquid will descend into the lower portion of vertical column 10 as shown in FIG. 3. However, instead of, as in the prior embodiment, a single fluid rising into the upper portion of vertical column 10, three fluids will rise. Of the three, the lightest will be drawn off through evacuation tube 116a, while the next lightest will be drawn off through evacuation tube 16b, and the lightest fluid will be drawn off through evacuation tube 16c. Each of the sections of column 10 associated with each of the three fluids has an inner vertical column 126a, 126b, and 126c respectively. These columns create a region within column 10 for the separated fluid to collect prior to exiting through their respective evacuation tubes 116a,b,c.

Although the present invention has been described with reference to particular embodiments herein set forth, it is understood that the present disclosure has been made by way of example only and that numerous changes in the details of construction may be resorted to without departing from the spirit and scope of the invention. Thus, the invention should not be limited by the foregoing specification, but rather only by the scope of the Claims appended hereto.

What is claimed is:

1. A fluid separator for separating two immiscible fluids having different specific gravities which comprises:
   a first reservoir which contains a first fluid which has a higher specific gravity than a second fluid;
   a vertical column having its lower end immersed in said first fluid in said first reservoir;
   a separation vessel disposed within said column so as to lay situate around the interface of the two fluids;
   an inlet conduit operably connected to said separation vessel;
   an evacuation tube operably connected to said vertical column; said evacuation tube being positioned above said inlet conduit;
   means for creating a partial vacuum connected to the upper end of said vertical column; and
   means for producing a siphon effect in said evacuation tube whereby, in operation the said vacuum means maintains a column of fluid in said vertical column and wherein a mixture of said first and second fluids is injected into the column through said inlet conduit and wherein separation of said fluids occurs in said separation vessel and said vertical column, said first fluid descending into said reservoir and said second fluid rising in the column and being withdrawn therefrom from said evacuation tube by said siphon effect.

2. The separator of claim 1 wherein said vacuum means comprises a vacuum pump and said siphon means applies a negative pressure slightly greater than that applied by said pump.

3. The separator of claim 1 wherein said siphon means comprises a second reservoir in which said evacuation tube terminates and positioned sufficiently below said first reservoir to maintain said siphon effect.

4. The separator of claim 1 wherein said separation vessel has a larger diameter than other portions of said vertical column.

5. The separator of claim 1 further comprising a trap operatively connected to said vertical column and to said evacuation tube whereby said second fluid is withdrawn from said column through said trap.

6. The separator of claim 5 wherein said trap includes a portion of said evacuation tube horizontally connected to said vertical column, a vertical tube operably connected to an downwardly projecting from aid evacuation tube, and a second horizontal tube operably connected to said vertical column and to said vertical tube.

7. The separator of claim 1 wherein said inlet conduit is operably connected to an auger which is in turn operably inserted into a body of a mixture of said first and second fluids.

8. The separator of claim 1 which includes means for effectively increasing the length of said vertical column, said last-named means including a first horizontal tube operably connected to said vertical column, a first vertical tube operably connected to the opposite end of said horizontal tube, a second horizontal tube having one end operably connected to the remaining end of said vertical tube, and a second vertical tube having one end operably connected to the remaining end of said second horizontal tube, the remaining end of said second vertical tube being positioned above the surface of the fluid in said first reservoir.

* * * * *